United States Patent

Gale et al.

[15] 3,637,017
[45] Jan. 25, 1972

[54] SURFACTANT FLOODING PROCESS

[72] Inventors: Walter W. Gale; Euell R. Rorie, both of Houston, Tex.

[73] Assignee: Esso Production Research Company

[22] Filed: June 1, 1970

[21] Appl. No.: 42,358

[52] U.S. Cl. ..............................................166/274, 166/273
[51] Int. Cl. .........................................................E21b 43/22
[58] Field of Search ..........................................166/273–275

[56] References Cited

UNITED STATES PATENTS

| | | | |
|---|---|---|---|
| 3,297,085 | 1/1967 | Herring | 166/273 |
| 3,373,809 | 3/1968 | Cooke | 166/273 |
| 3,302,713 | 2/1967 | Ahearn et al. | 166/274 |
| 3,497,006 | 2/1970 | Jones et al. | 166/273 |
| 3,444,930 | 5/1969 | Williams et al. | 166/273 |
| 2,808,109 | 10/1957 | Kirk | 166/275 |
| 3,079,336 | 2/1963 | Stright et al. | 166/275 |
| 3,497,007 | 2/1970 | Williams et al. | 166/273 |

*Primary Examiner*—Stephen J. Novosad
*Attorney*—James A. Reilly, John B. Davidson, Lewis H. Eatherton, James E. Gilchrist, Robert L. Graham and James E. Reed

[57] ABSTRACT

A method of recovering oil from a subterranean oil-bearing formation in which an aqueous surfactant solution is injected into the formation and displaced by a dilute solution of alcohol in water. In another embodiment, the alcohol and surfactant are contained in the same solution and this solution is displaced through the formation to recover oil.

18 Claims, 6 Drawing Figures

INVENTORS
EUELL R. RORIE
WALTER W. GALE
BY
Lewis H. Eatherton
ATTORNEY

SURFACTANT FLOODING PROCESS

BACKGROUND OF THE INVENTION

1. Field of the Invention

This invention relates to a process for recovering oil from a subterranean formation. More particularly, this invention relates to a process for recovering oil from a subterranean formation in which an aqueous solution of a surface active agent is displaced by water containing minor amounts of alcohol.

2. Description of the Prior Art

The petroleum industry has recognized for many years that only a portion of the original oil-in-place in an oil reservoir can be produced by natural mechanisms. It is also well known that conventional methods of supplementing natural recovery are relatively inefficient. Typically, a reservoir may retain half of its original oil even after the application of currently available methods of secondary recovery. Accordingly, there is a continuing need for improved recovery methods which will substantially increase the ultimate yield of petroleum from subterranean reservoirs.

Waterflooding is by far the most economical and widely practiced of secondary recovery methods. In such a process, water is introduced through injection wells to drive oil through the formation and to offset producing wells. Much of the current work in secondary recovery technology has been directed toward improving the efficiency of waterflooding processes.

Surface active agents or surfactants are one class of materials which have been proposed for improving the efficiency of waterflooding processes. Much of the oil that is retained in the reservoir after a typical waterflood is in the form of discontinuous globules or discrete droplets which are trapped within the pore spaces of the reservoir. It has been suggested that, because the normal interfacial tension between the reservoir oil and water is so high, these discrete droplets are unable to sufficiently deform to pass through narrow constrictions in the pore channels. When surface active agents are added to the flooding water, they lower the interfacial tension between the water and the reservoir oil and permit the oil droplets to deform and flow with the flood water.

Anionic surfactants and particularly the petroleum sulfonates have gained wide recognition as waterflood additives. Certain types of these petroleum sulfonates can radically lower the interfacial tension between the flood water and the reservoir oil and are relatively inexpensive. See, for example, U.S. Pat. No. 3,302,713, issued Feb. 7, 1967, to Ahearn et al. This patent discloses methods of preparing sulfonated surfactants from specified petroleum fractions and proposes that such petroleum sulfonates be used in recovering oil from a subterranean formation. It has been found that these sulfonates can be readily and inexpensively prepared and that they are highly efficient in recovering oil.

One difficulty which has been observed in the use of surfactants in general and particularly in the use of the petroleum sulfonates in oil recovery processes is a tendency of the surfactants to be depleted from the injected solution. It has been postulated that at least a part of the surface active agent may be adsorbed on the rock surface of the reservoir or physically entrapped within the pore spaces of the rock matrix. As a consequence, a portion of the surface active agent is removed from the waterflood solution as it moves through the reservoir and the surface active agent is not available to act at the oil-water interface. Quite naturally, this problem of surfactant depletion results in a decrease in oil recovery efficiency.

A number of suggestions have been proposed to combat this problem of surfactant depletion. For example, it has been suggested in U.S. Pat. No. 3,474,864, issued Oct. 28, 1969 to Hurd that an aqueous saline solution of a petroleum sulfonate surfactant be displaced by a bank or slug of less saline water. The patent suggests that the less saline water will desorb surfactant from the rock matrix and enable it to move further through the oil-bearing formation.

As a further example, it has been suggested in U.S. Pat. No. 3,469,630, issued Sept. 30, 1969 to Hurd et al., that a solution containing an inorganic polyphosphate be injected into the formation in advance of the surfactant solution. This patent suggests that the inorganic polyphosphate will be adsorbed on the surface of the rock and thereby minimize adsorption of the surfactant in the following flood water. While the methods of the prior art appear to be effective to a certain extent in reducing depletion of the surfactant, there is a continuing need to further combat this problem.

It has been previously suggested that dilute aqueous solutions of alcohol could be effective in recovering oil from a subterranean formation. Palmer, "Use of Alcoholic Solutions in Secondary Recovery of Oil," The Mines Magazine, pages 420 and 460, Aug., 1940. Although this proposal was advanced 30 years ago, it has never been proven effective in recovering oil from subterranean formations. The publication suggests that the alcohol in aqueous solution will reduce the interfacial tension between oil and water and assist in the recovery of the oil. However, the investigatory work which led to this conclusion was performed under conditions which are not truly representative of an oil-bearing formation. These experiments were conducted in glass tubes which had been packed with sand. It is felt that the interfacial forces in these sand-packed tubes which prevented oil recovery by waterflooding were unrealistically low, and therefore the dilute alcoholic solutions showed an apparent benefit in oil recovery which could not be realized under actual operating conditions. When this method is attempted under more realistic conditions i.e., in consolidated sandstone cores, no apparent increase in the recovery of oil from the core can be noted.

SUMMARY OF THE INVENTION

In the practice of this invention, an aqueous solution of a petroleum sulfonate surfactant is injected into the formation. The surfactant solution is then displaced with water containing minor quantities of alcohol. The volume of the water-alcohol solution is preferably small, and this solution is in turn displaced by available flood water. Minor quantities of alcohol may be included in the surfactant solution as well as in the displacing water. Viscosity-increasing agents may be included in the surfactant solution and in the water-alcohol solution.

It is a primary object of this invention to improve the recovery of oil from a subterranean formation.

It is a further object of this invention to improve the recovery of oil from a subterranean formation using a surfactant solution which is displaced through the formation by a water-alcohol solution.

It is another object of this invention to reduce the depletion of surfactant in a surfactant waterflooding process for recovering oil.

It is a further object of this invention to provide a method for recovering injected surfactant from a subterranean formation in a surfactant waterflooding process.

These and other objects of this invention will be apparent from the following drawing and discussion of the preferred embodiment.

DESCRIPTION OF THE PREFERRED EMBODIMENT

The benefits and advantages which can be obtained with the practice of this invention can be most easily seen with reference to the drawings. These drawings are graphical illustrations of core displacement tests which are commonly used to determine the efficiency of an oil recovery process.

The cores used in these displacement tests were sections of Berea sandstone having cross sections of 1 inch by 1 inch and lengths of 48 inches. The cores had permeabilities of approximately 350 millidarcies, plus or minus 10 percent, and were mounted in Lucite with tap-fittings at each end for the injection and production of fluids.

Prior to conducting the displacement tests, the cores were flooded with oil and brine to approximate the oil and water saturations that would exist in an oil reservoir which had been waterflooded to the point that no further oil could be produced. In these flooding operations, the cores were first saturated with a standard brine solution containing approximately 1.5 percent by weight sodium chloride in distilled water. The cores were then flooded with a Mid-continent crude oil having a 42° API gravity until no further brine could be produced. The cores were then once again flooded with the standard brine solution to remove all of the oil which could be recovered by this conventional waterflooding process. At this point the quantities of oil and water remaining in the cores approximated those of a reservoir which had been waterflooded to residual oil saturation. The residual oil in each of these cores was approximately 30 percent of the pore volume of the core; the remaining 70 percent was saturated with the standard brine. During these saturations procedures and the subsequent displacement tests, the pressure drop across these cores was held to a level of approximately 13.5 p.s.i.g.

After the cores had been waterflooded to residual oil saturation, a series of displacement tests were conducted on the cores to illustrate the benefits and advantages of this invention as compared to conventional surfactant waterflooding. These displacement tests further illustrate the best mode for the practice of this invention. The results of these displacement tests are shown in FIGS. 1–6 and are discussed in detail hereinafter.

Figure 1:
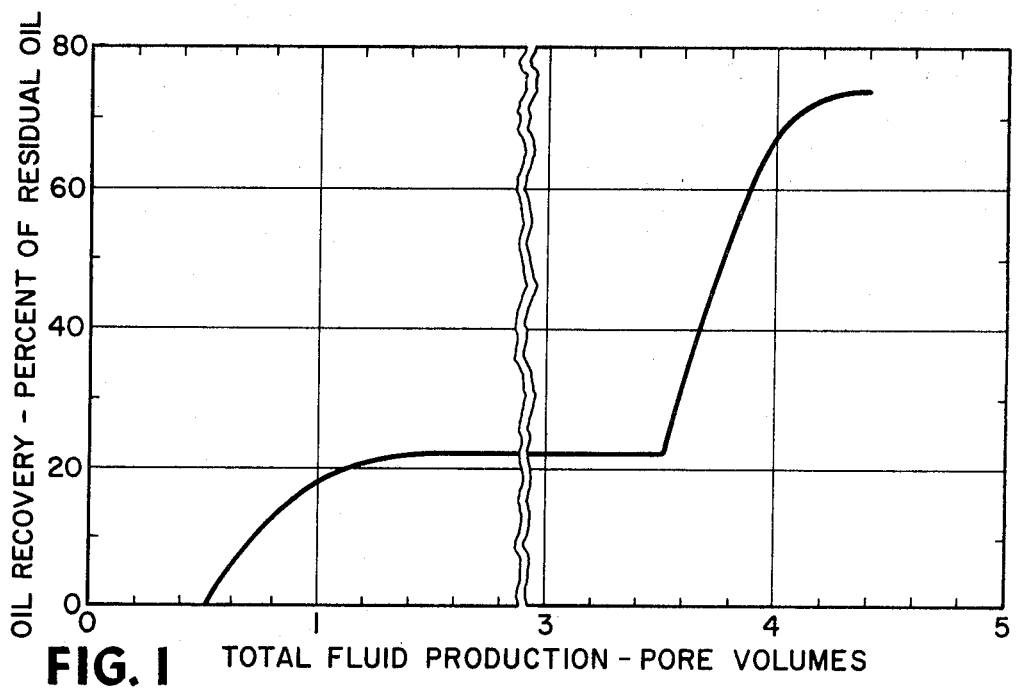
FIGS. 1, 2, and 4–6, are graphs of the results of core displacement tests showing oil recovery as a function of total fluid production. The oil recovery is expressed as a percent of the residual oil remaining after waterflooding. The total fluid production is the volume of all fluids produced subsequent to waterflooding and is expressed in pore volumes of the cores.

FIG. 1 graphically illustrates the increased oil recovery which can be realized by displacing an aqueous surfactant solution with a dilute alcoholic solution. It should be understood that the displacement test illustrated in FIG. 1 is not intended to represent the preferred mode for practicing this invention. FIG. 1 is, however, an illustration of the benefits and advantages which can be attained in the practice of this invention.

In the displacement test of FIG. 1, a solution containing 1 percent by weight sodium carbonate and 2 percent by weight of a sodium petroleum sulfonate surfactant in distilled water was injected into the waterflooded core. Injection of this solution was continued until approximately 0.5 pore volume of fluid had been injected and produced. The surfactant solution was followed by the standard brine solution until a total of approximately 3.0 pore volumes of fluid had been injected into the core.

As can be seen from FIG. 1, the oil recovery by the surfactant solution reached approximately 22 percent of the residual oil after the injection of a total of 1.5 pore volume of fluid. The injection of the standard brine solution was continued until a total of 3.0 pore volume of total fluid had been displaced, but no further oil was produced. This 22 percent recovery, thus, represented the maximum quantity of oil which could be produced by conventional surfactant waterflooding under these conditions.

A solution containing 10 percent by volume isopropyl alcohol in distilled water was then injected into the core. After the injection of approximately 0.5 pore volume of this fluid, the oil recovery began to rise radically. After the injection of 1.2 pore volumes of the alcoholic solution, the oil recovery increased from approximately 22 percent to approximately 72 percent of the residual oil. Thus, the dilute alcoholic solution following the surfactant flood recovered more than three times the quantity of oil which was recovered by conventional surfactant waterflooding alone.

The surfactant employed in the displacement test of FIG. 1 and the surfactants employed in the displacement tests described hereinafter were sodium petroleum sulfonates. These surfactants were prepared from petroleum refinery streams with 10 percent boiling points of 800°–850° F. and 90 percent boiling points of 970°–1,000° F. as determined by the ASTM Standard Method of Distillation D1160–61. These refinery streams were reacted with gaseous $SO_3$ to produce petroleum sulfonic acids and neutralized with sodium hydroxide to produce the corresponding sodium salts or sodium petroleum sulfonates. The average equivalent weights of the surfactants (the average molecular weights divided by the average number of sulfonate groups per molecule) were within the range of 465–480. While this invention will be described with reference to these petroleum sulfonates and surfactants of this class are preferred for use in the practice of this invention, it should be realized that this invention is not limited to the use of such surfactants. It is contemplated that this invention will be broadly applicable to any surfactant flooding process where depletion or adsorption is evident.

Figure 2:
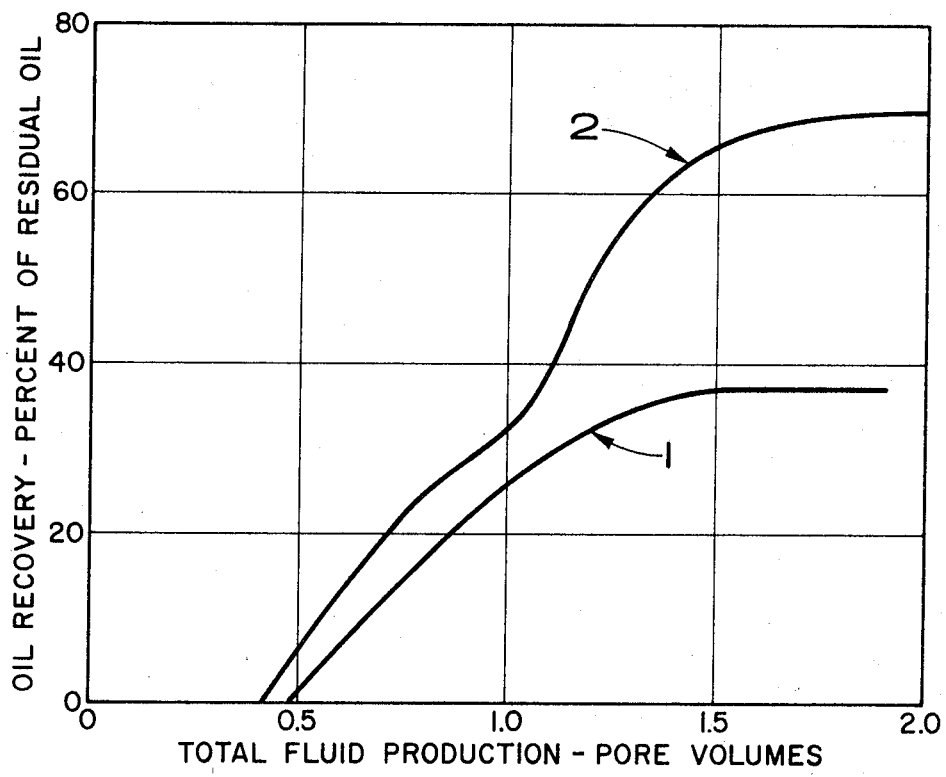

FIG. 2 further illustrates the comparative benefit which can be attained through the practice of this invention. Curve 1 shows a conventional surfactant waterflood; curve 2 shows the increased oil recovery obtained by displacing a surfactant solution with a dilute alcohol solution.

In the displacement test illustrated by curve 1, a 0.5 pore volume bank of a solution containing 1 percent by weight sodium carbonate and 2 percent by weight of a sodium petroleum sulfonate surfactant in distilled water was injected into the core. The surfactant solution was then displaced by the standard brine solution until no more oil could be produced. As can be seen from FIG. 2, this conventional surfactant waterflood recovered approximately 37 percent of the residual oil from the core.

In the displacement test illustrated by curve 2, a solution containing 2 percent by weight of a sodium petroleum sulfonate surfactant and 1 percent by weight sodium carbonate in distilled water was injected into the core. The quantity of surfactant solution injected was 0.5 pore volume. The surfactant solution was then displaced with a 0.4 pore volume bank of distilled water containing 2 percent by volume isopropyl alcohol. The alcoholic solution was then displaced by standard brine solution until oil recovery ceased.

The comparative benefit of displacing the surfactant solution with an alcoholic solution is readily apparent from FIG. 2. Initially, the recovery of the displacement test illustrated in curve 2 behaves much like that illustrated in curve 1. However, at about 1 pore volume total fluid production the effect of the displacing alcoholic solution becomes apparent and the recovery of residual oil radically increases. After 2 pore volumes of total production, the displacement test illustrated in curve 2 recovers almost 70 percent of the residual oil in the core. This recovery is approximately double the amount recovered in the displacement test illustrated in curve 1.

An additional displacement test was conducted under the same conditions as the test of curve 2, FIG. 2 except that the concentration of isopropyl alcohol in the distilled water was increased from 2 to 10 percent by volume. The results of the 10 percent alcohol displacement test were essentially a duplicate of curve 2, FIG. 2. The increase in alcohol concentration did not significantly change the recovery of residual oil, and it did not significantly change the rate of oil recovery with respect to total fluid production.

Figure 3:
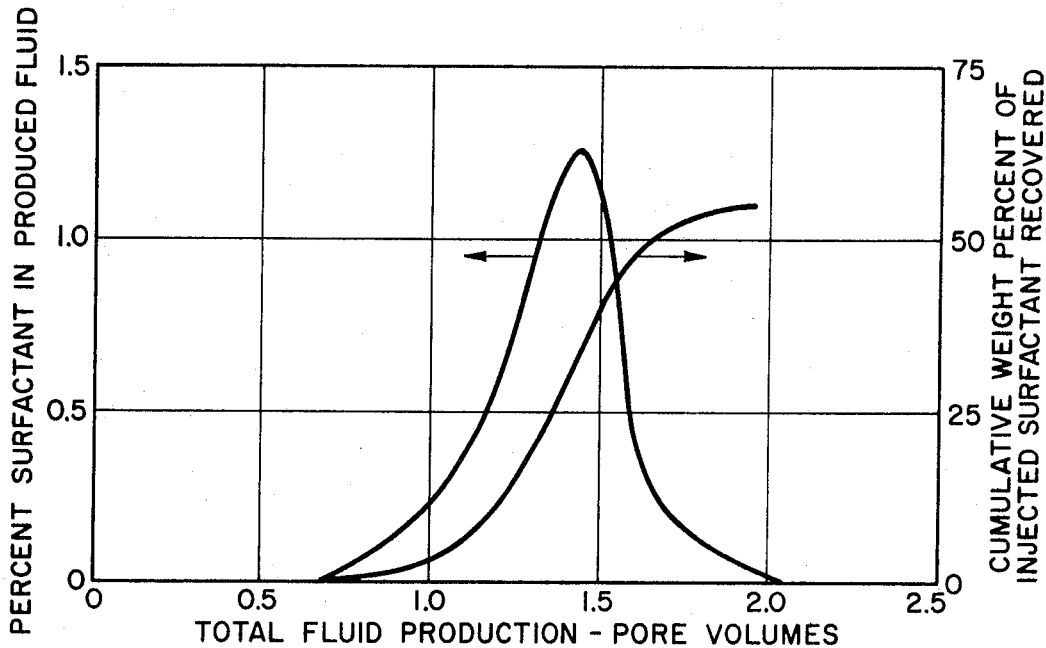
FIG. 3 is a graph which illustrates the ability of the process of this application to recover injected surfactant. The graph shows the weight percent of surfactant in the produced fluid and the cumulative weight percent of surfactant recovered as a function of the pore volumes of fluid produced in the displacement test illustrated in curve 2 of FIG. 2.

FIG. 3 illustrates an additional benefit which can be obtained in the practice of this invention—the recovery of surfactant in the produced fluids. The petroleum sulfonates have a tendency to be retained within the core in conventional surfactant waterflooding displacement tests, and the recovery of surfactant in such a displacement test is seldom as high as 30 percent of the quantity injected. FIG. 3 shows the surfactant recovery achieved during the displacement test illustrated in curve 2 of FIG. 2. As can be seen from FIG. 3, more than one-half of the surfactant was recovered during this displacement test. Perhaps of more significance is the fact that the recovered surfactant was produced in a relatively narrow volumetric interval. Approximately three-quarters of the recovered surfactant was produced in the 0.5 pore volume interval between 1.1 and 1.6 pore volumes of total fluid produced. In terms of an actual field operation, the results illustrated in FIG. 3 indicate that significant quantities of surfactant can be recovered from the formation and reused in the recovery operation. Moreover, the produced surfactant will be recovered over a relatively narrow range of produced volumes which will simplify the recovery and reuse of the produced surfactant.

While not wishing to be bound by any specific theoretical explanation for achieving the benefits of this invention, it is believed that the dilute alcohol-water solution may be a superior and beneficial solvent for surfactant molecules which have been retained within the matrix of the porous and permeable rock. This dilute alcohol solution appears to remobilize surfactant which is entrapped in the rock, move the surfactant forward and thereby recover additional quantities of oil.

It seems clear that the benefits of this invention are realized by the combined effects of the components of the system and by the order in which these components are injected. It can be seen from FIGS. 1 and 2 that the alcohol is necessary in the practice of this invention. The necessity of the alcohol can also be seen from the results of another displacement test in which a surfactant solution was displaced by a standard brine solution. Subsequently, distilled water which did not contain any alcohol was injected into the core. Except for the absence of the alcohol, this displacement test was similar to the test illustrated in FIG. 1. The results of the alcohol-free displacement test were, however, radically different. After the alcohol-free water was injected into the core, only minor quantities of additional oil were recovered. The core plugged before 1 pore volume of the water could be injected, and no more fluids—oil or water—could be recovered from the core. Also, as will be discussed in greater detail hereinafter, the surfactant is a necessary component in the practice of this invention. The alcohol-water solution will not recover any significant amount of residual oil in the absence of the surfactant.

The order in which the components are injected is also important. The surfactant solution must be injected prior to the water-alcohol solution. Where the water-alcohol solution is injected first, no benefit over conventional surfactant waterflooding is noted. The surfactant and alcohol, may however, be simultaneously injected in an aqueous solution. Some increase in recovery is noted in such a case over conventional surfactant waterflooding, but, the oil recovery in this injection sequence is not as great as when the surfactant solution is displaced by the water-alcohol solution. Also, the alcohol may be included in both the surfactant solution and in the displacing water. These aspects of this invention will be more easily understood by referring to FIGS. 4–6.

Figure 4:
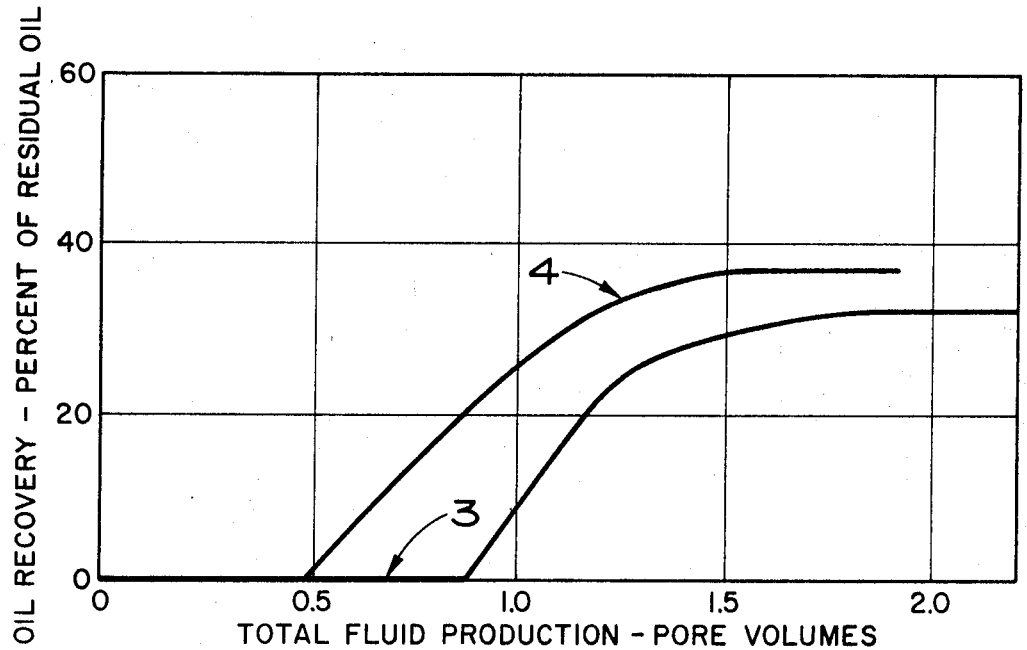

FIG. 4 illustrates two important features of this invention. First, it shows that the dilute alcohol-water solution is not effective in recovering oil in the absence of the surfactant. Second, it shows that when the alcohol-water solution is injected prior to the surfactant solution, there is no improvement in oil recovery compared to conventional surfactant waterflooding.

These aspects can be seen most clearly with reference to FIG. 4. Curve 3 showed the results of a displacement test where a dilute alcohol solution in distilled water was injected prior to a surfactant solution. In the displacement test, approximately 0.4 pore volume of a solution containing 2 percent by volume isopropyl alcohol in distilled water was injected into the core. This dilute alcohol solution was displaced with a solution of 2 percent by weight of petroleum sulfonate surfactant and 1 percent by weight sodium carbonate in distilled water. Approximately 0.5 pore volume of the surfactant solution was injected which was in turn displaced by the standard brine solution.

As can be seen by inspection of FIG. 4, no oil was recovered by the alcohol solution; no increase in oil recovery was noted until the oil bank preceding the surfactant solution began to be produced at about 0.9 pore volume. The oil recovery of the displacement test illustrated in curve 3 is no better than what would be expected if the surfactant solution had been preceded by a 0.4 pore volume bank of standard brine solution. In other words, the presence of the alcohol solution preceding the surfactant bank was of no apparent benefit.

For comparative purpose, curve 1 of FIG. 2 is reproduced as curve 4 of FIG. 4. Comparison of curves 3 and 4 shows that the alcohol bank preceding the surfactant bank does not improve oil recovery over the conventional surfactant waterflooding illustrated by curve 4.

Figure 5:
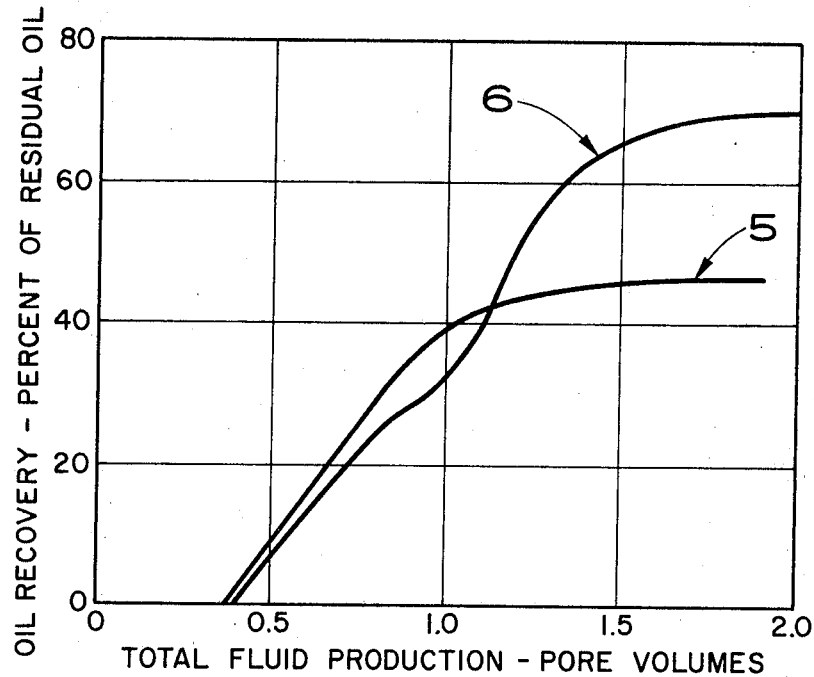

FIG. 5 is a comparative illustration of two displacement tests which show the benefit of following the surfactant bank with an alcohol solution as opposed to including the alcohol in the surfactant solution. Curve 5 shows the result of a displacement test where the alcohol and surfactant were simultaneously injected into the core. Curve 6 is a reproduction of curve 2, FIG. 2, a displacement test where the surfactant solution was displaced by a dilute alcohol-water solution.

In the displacement test illustrated in curve 5, a 0.5 pore volume bank containing 2 percent by weight sodium petroleum sulfonate surfactant, 1 percent by weight sodium carbonate, and 10 percent by volume isopropyl alcohol in distilled water was injected into the core. This surfactant-alcohol solution was then displaced with standard brine.

As can be seen from inspection of FIG. 5, the simultaneous injection of alcohol and surfactant is less beneficial in recovering oil than displacement of the surfactant solution with an alcohol solution as shown in curve 6. The recovery by simultaneous injection is approximately 46 percent of the residual oil; recovery by sequential injection is approximately 70 percent of residual. It will be noted, however, that the simultaneous injection of alcohol and surfactant recovers more oil than prior injection of the alcohol as illustrated by curve 3, FIG. 4 or total absence of the alcohol as illustrated by conventional surfactant waterflooding curve 4, FIG. 4.

In the practice of this invention it may be desirable to include the alcohol in both the surfactant solution and in the water which displaces the surfactant solution through the reservoir. The comparative advantage of this injection sequence can be seen in FIG. 6. Curve 7 illustrates a displacement test in which alcohol was contained in a portion of the surfactant solution and in the water which displaces the surfactant. Curve 8 is a reproduction of curve 2, FIG. 2 and shows the recovery obtained by displacing an alcohol-free surfactant bank with a dilute alcohol solution.

In the displacement test illustrated by curve 7 a solution containing 2 percent by weight of a sodium petroleum sulfonate, 1 percent by weight sodium carbonate in distilled water was injected into the core. The surfactant solution was injected until approximately 0.3 pore volume had been displaced. At that point, 2 percent by volume is isopropyl alcohol was added to the surfactant solution and injection was continued until 0.5 pore volume of total fluid had been injected. Subsequently, a solution of 2 percent by volume isopropyl alcohol in distilled water was injected into the core. After the injection of a total of 0.8 pore volume of fluid injected, the alcohol-distilled water injection was halted and standard brine solution was injected for the remainder of the test.

Figure 6:
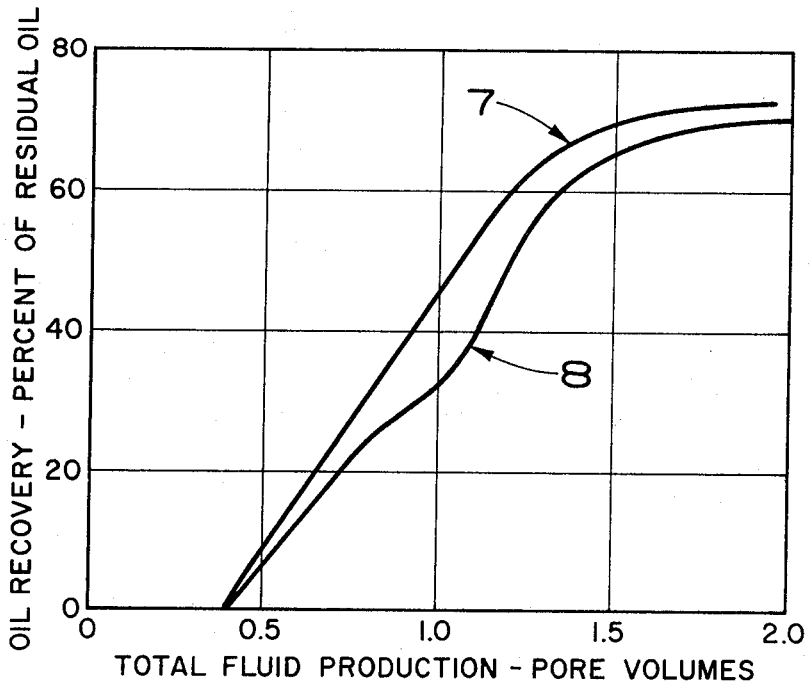

As can be seen from the inspection of FIG. 6, inclusion of alcohol in a portion of the surfactant solution eliminated the decline in production which occurred at approximately 1 pore volume on curve 8.

From the foregoing discussion, it will be apparent that, in the preferred embodiment of this invention, an aqueous solution of a surfactant such as a petroleum sulfonate is injected into an oil-bearing formation. The surfactant solution is then displaced by water containing minor amounts of alcohol. Finally, the alcohol solution is displaced by oil field brine or other available water.

The art of using surfactant solutions to recover oil from subterranean formations has not been, and need not be, discussed in detail herein. These processes have been extensively described in the literature and are well known to those skilled in the art of petroleum production. See, for example, U.S. Pat. No. 3,302,713 issued Feb. 7, 1967, to Ahearn et al. which describes in detail methods of making and using suitable petroleum sulfonates for recovering oil. The surfactants disclosed in that patent are preferred for use in the practice of this invention. Such surfactants are typically prepared by sulfonating a petroleum refinery stream containing at least 10 percent of the sulfonatable hydrocarbons occurring in a 700°–1,100° F. boiling range of a petroleum crude and, subsequently, neutralizing the reaction product with a base such as sodium hydroxide.

An aqueous solution is prepared from the surfactant and a compatible water, and this solution is injected into the oil-bearing formation. Compatible waters are those which do not contain significant quantities of materials such as divalent ions which might cause complexing or precipitation of the surfactant or excessive quantities of other salts which might cause the surfactant to precipitate from solution. The concentration of the surfactant in the aqueous solution may range between 0.5 and 10 percent by weight. In most applications, however, the surfactant concentration will be in the range of 1 to 5 percent by weight.

Other materials which do not adversely affect the properties of the surfactant may be included in the aqueous surfactant solution. For example, certain basic compounds such as ammonia and sodium carbonate have been found to be beneficial in preventing the precipitation of these surfactants when the water in the formation contains significant amounts of divalent ions. These basic substances may be employed in concentrations which range up to 3 percent by weight. However, it is generally preferred to maintain their concentrations at a level of 1.5 percent by weight or lower. A particularly suitable mixture of bases for the surfactant solution is 0.75 weight percent sodium carbonate and 0.5 weight percent ammonia. The surfactant solution may also contain viscosity-increasing agents to improve the ability of the surfactant solution to displace oil. A typical viscosity-increasing agent would be a heteropolysaccharide of the type disclosed in U.S. Pat. No. 3,305,016, Lindblom et al. The quantity of a viscosity-increasing agent included in the surfactant solution will, of course, depend upon the desired viscosity.

As previously discussed, the alcohol may be placed solely in the surfactant solution. This is more beneficial than conventional surfactant flooding. The full benefits of this invention are best realized, however, when at least a portion of the alcohol is contained in the displacing water.

The quantity of surfactant solution to be employed in the practice of this invention will depend upon the volume of the reservoir to be flooded. The volume of the reservoir to be flooded may be the entire oil-bearing formation or may be limited to a portion of the formation which might be defined by a five-spot injection-production pattern, for example. Typically, the quantity of surfactant solution injected will vary between 0.1 and 1.0 pore volume of the reservoir or portion of reservoir which is to be flooded with the surfactant solution. In most applications, a surfactant solution of 0.3 to 0.5 pore volume will be satisfactory.

As previously discussed in the preferred embodiment, the alcohol may be included in both the surfactant solution and the displacing water or solely the displacing water. In either event, the displacing water will contain at least a part of the alcohol. Other compatible materials such as the previously mentioned viscosity-increasing agents may also be included in the displacing water. The displacing water should not, of course, contain substantial amounts of materials which are incompatible with the surfactant, such as divalant cations, or other materials which will interfere with the beneficial effects of the alcohol. For example, in a displacement test where a surfactant solution was displaced by water containing 2 percent by volume isopropyl alcohol and 1.5 percent by weight sodium chloride, no benefit over conventional surfactant waterflooding was noted. Since this displacement test was conducted under comparable conditions to the test illustrated in curve 2, FIG. 2 except for the presence of the sodium chloride in the displacing water, it can be concluded that this concentration of sodium chloride was detrimental to the beneficial effect of the alcohol in this system. Other materials and other concentrations of dissolved solids can be easily and readily tested for their compatibility in a given system by such core displacement tests. For most purposes, however, displacing water containing up to 5,000 p.p.m. total dissolved solids will be satisfactory in the practice of this invention. Such water can be obtained form any readily available source such as lakes, streams, or shallow water wells. The volume of displacing water injected may be from 0.1 to 1.0 pore volume of the reservoir or portion of the reservoir to be flooded, and, in most instances, this volume will be in the range of 0.3 to 0.5 pore volume. This displacing water will preferably be displaced by oil field brine or other available water. It should be recognized, however, that the displacing water can be continuously injected, but, that such continuous injection would generally be less economical than the use of a relatively small volume bank.

The alcohols used in the practice of this invention are aliphatic hydrocarbons with hydroxyl substituents and having no more than eight carbon atoms. These materials include the mono, di, and polyhydric alcohols, both saturated and unsaturated. By way of example but not limitation, suitable alcohols may be methanol, ethanol, isobutanol, isopropanol, tertiary amyl alcohol and isohexanol. The alcohol may be a single compound of the class described or may be a mixture of one or more of such compounds. The alcohols may be in a substantially pure form or may be an industrial grade alcohol such as those produced by hydration of alkenes or aldol condensation. Such industrial grade alcohols will contain predominant amounts of alcohol, e.g., approximately 85 percent, and minor amounts of other polar organic compounds such as ketones, aldehydes, ethers, carboxylic acids and the like.

The concentration of alcohol to be employed in either the surfactant solution or the displacing water solution or both solutions may vary broadly. The maximum concentration of the alcohol to be employed in these solutions should be no greater than its solubility limit or 10 percent by volume, whichever is less. It has been found that no additional benefit can be obtained by using solutions containing more than 10 percent by volume alcohol. Therefore, the use of more concentrated alcohol solutions would be more expensive with no corresponding advantage in the recovery of surfactant or oil. For convenience and clarity, these solutions containing no more than 10 percent by volume alcohol are referred to herein as dilute alcohol solutions.

The minimum concentration of alcohol which can be employed in these solutions is easily determined. Conventional and well known core flooding techniques can be employed to determine the effectiveness of an alcohol as a function of its concentration in its aqueous solution. Generally speaking, an alcohol concentration will be useful in the practice of this invention if, at such a concentration, the presence of the alcohol in a displacement test will result in the recovery of more surfactant than can be obtained in a corresponding displacement test of a conventional surfactant waterflood without the alcohol. The effective concentration of alcohol can be surprisingly low. For example, it has been found that as little as 500 p.p.m. isohexanol in an aqueous solution is effective in the practice of this invention.

The alcohol may be included solely in the surfactant solution but preferably at least a portion, and in other cases all, of the alcohol will be contained in the water which displaces the surfactant solution. The total volume of the portion of the solution or solutions which contains the alcohol may vary between 0.1 and 1.0 pore volume of the reservoir or portion of the reservoir to be flooded. For most conditions, however, this volume will be in the range of 0.3 to 0.5 pore volume.

A typical operation in which this invention might be carried out is illustrated by the following example:

A subterranean oil-bearing formation has been waterflooded in a conventional manner to a residual oil saturation of approximately 30 percent of the formation pore volume. A surfactant solution is first prepared on the surface using available surface water. The surfactant is a sodium petroleum sulfonate prepared by the sulfonation of a petroleum refinery stream containing hydrocarbons occurring in the 700°–1,100° F. boiling range of a petroleum crude and the neutralization of the reaction product to produce the sodium salt. This petroleum sulfonate is added to water in a concentration of 2 percent by weight. Other additives included in the surfactant solution are 0.75 percent by weight sodium carbonate, 0.5 percent by weight ammonia and sufficient heteropolysaccharide of the type disclosed in U.S. Pat. No. 3,305,016, issued to Lindblom et al. to raise the viscosity of the surfactant solution to approximately 10 centipoise. This solution is injected into the formation by means of an injection well in a volume which is equal to 30 percent of the pore volume of the portion of the reservoir to be flooded. The surfactant solution is then displaced by an equal volume of water containing 2 percent by volume isobutanol and sufficient heteropolysaccharide to increase the viscosity of this solution to approximately 10 centipoise. The water-alcohol solution is then displaced through the reservoir by the injection of an oil field brine containing 1.5 weight percent sodium chloride. The injection of brine is continued to drive the injected surfactant and water-alcohol solutions to offset producing wells where oil, surfactant and alcohol are recovered.

The principle of the invention and the best mode in which it is contemplated to apply that principle have been described. It is to be understood that the foregoing is illustrative only and that other means and techniques can be employed without departing from the true scope of the invention defined in the following claims.

What is claimed is:

1. A method for recovering oil from a subterranean formation which comprises injecting into the formation an aqueous solution including a surface active agent, then injecting into the formation a solution containing at least 90 volume percent water, between 0.05 and 10 volume percent alcohol having no more than eight carbon atoms, and substantially free of hydrocarbon oil to displace the surface active agent solution through the formation, and recovering oil from the formation.

2. A method for recovering oil from a subterranean oil-bearing formation which comprises injecting into the formation a petroleum sulfonate surfactant in an aqueous solution and in an amount effective to reduce the interfacial tension between the formation oil and water, subsequently, injecting into the formation a substantially oil-free solution containing a predominant portion of water as a solvent and between 0.05 and 10 percent by volume of alcohol having no more than eight carbon atoms as a solute, ;isplacing the surfactant solution and the alcohol solution through the formation with a third aqueous solution and recovering oil from the formation.

3. An improved process for waterflooding an oil-bearing subterranean formation where a surfactant solution is injected into the formation and displaced through the formation to recover oil wherein the improvement comprises displacing the surfactant solution with a solution containing at least 90 volume percent water and at least 0.05 percent by volume of alcohol having from one to eight carbon atoms, said alcohol-water solution being substantially insoluble in said oil.

4. A method for recovering oil from a subterranean oil-bearing formation which comprises injecting into the formation an aqueous solution of an anionic surfactant, then, injecting into the formation a second solution containing from 0.05 to 10 volume percent aliphatic organic compound having at least one hydroxyl substituent and having from one to eight carbon atoms, at least 90 volume percent water and substantially free of surfactant, subsequently, injecting a third aqueous solution into the formation to displace the surface solution and the aliphatic organic compound solution, and recovering oil from the formation.

5. A method as defined by claim 4 wherein the anionic surfactant is a petroleum sulfonate.

6. A method as defined by claim 5 wherein the petroleum sulfonate is a sodium petroleum sulfonate obtained by the sulfonation of the sulfonatable constituents occurring in a 700°–1,100° F. boiling range fraction of a petroleum crude.

7. A method as defined by claim 4 wherein the aliphatic organic compound is an industrial grade alcohol.

8. A method as defined in claim 4 wherein the aliphatic organic compound is saturated.

9. A method as defined by claim 4 wherein the aliphatic organic compound is unsaturated.

10. A method as defined by claim 4 wherein the aliphatic organic compound has at least two hydroxyl substituents.

11. A method as defined by claim 4 wherein the second aqueous solution contains less than 5,000 parts per million total dissolved solids.

12. A method as defined by claim 4 wherein the volume of the surfactant solution injected into the formation is within the range of 0.1 to 1.0 of the pore volume of the reservoir to be flooded.

13. A method as defined by claim 4 wherein the volume of the second aqueous solution lies within the range of 0.1 to 1.0 of the pore volume of the reservoir to be flooded.

14. A method as defined by claim 4 wherein the surfactant solution further includes minor amounts of an aliphatic organic compound having at least one hydroxyl substituent.

15. A method as defined by claim 4 wherein the surfactant solution contains a viscosity-increasing agent.

16. A method as defined by claim 4 wherein the second aqueous solution contains a viscosity-increasing agent.

17. An improved surfactant waterflooding process for recovering oil from a subterranean formation by injecting an aqueous solution containing a surfactant into the formation, displacing the surfactant solution through he formation, and recovering oil in which the improvement comprises displacing the surfactant solution with a solution being substantially free of hydrocarbon oil and containing at least 90 volume percent water and an amount of aliphatic organic compound having one to eight carbon atoms and having at least one hydroxyl substituent sufficient to increase the recovery of surfactant from the formation.

18. A method of recovering oil from a subterranean formation which comprises injecting into the formation an aqueous solution comprising water and between 0.5 to 10 weight percent of a petroleum sulfonate surfactant, the volume of surfactant solution being equal to from 0.1 to 1.0 of the pore volume of the portion of the formation being flooded, then, injecting into the formation an aqueous alcohol solution being substantially free of hydrocarbon oil and containing at least 90 volume percent water and an amount of aliphatic organic compound having no more than eight carbon atoms and one hydroxyl substituent sufficient to increase the recovery of surfactant from the formation, the volume of the alcohol solution being equal to from 0.1 to 1.0 of the pore volume of the formation being flooded, subsequently, injecting into the formation a third aqueous solution to displace the surfactant solution and the alcohol solution through the formation, and recovering oil from the formation.

* * * * *